(12) United States Patent
Pan et al.

(10) Patent No.: US 8,031,795 B2
(45) Date of Patent: Oct. 4, 2011

(54) PRE-PROCESSING SYSTEMS AND METHODS FOR MIMO ANTENNA SYSTEMS

(75) Inventors: Zhen Gang Pan, Hong Kong (CN); Xue Yuan Zhao, Hong Kong (CN)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 1137 days.

(21) Appl. No.: 11/637,287

(22) Filed: Dec. 12, 2006

(65) Prior Publication Data
US 2008/0137635 A1    Jun. 12, 2008

(51) Int. Cl.
*H04B 7/02* (2006.01)
*H04L 27/00* (2006.01)
*H04L 12/26* (2006.01)

(52) U.S. Cl. .................. 375/267; 375/257; 370/252

(58) Field of Classification Search .............. 375/267, 375/257; 370/252
See application file for complete search history.

(56) References Cited

U.S. PATENT DOCUMENTS

| | | | |
|---|---|---|---|
| 6,400,761 B1 | 6/2002 | Smee et al. | |
| 6,862,271 B2 | 3/2005 | Medvedev et al. | |
| 7,433,661 B2 | 10/2008 | Kogiantis et al. | |
| 7,558,554 B2* | 7/2009 | Hoo et al. | 455/277.1 |
| 7,684,762 B2* | 3/2010 | Ihm et al. | 455/69 |
| 2003/0081669 A1 | 5/2003 | Yousef et al. | |
| 2003/0185309 A1* | 10/2003 | Pautler et al. | 375/257 |
| 2004/0160916 A1* | 8/2004 | Vukovic et al. | 370/332 |
| 2005/0052991 A1* | 3/2005 | Kadous | 370/216 |
| 2005/0186921 A1 | 8/2005 | Hoo et al. | |
| 2005/0195912 A1 | 9/2005 | Kim et al. | |
| 2005/0201307 A1 | 9/2005 | Chae et al. | |
| 2006/0056533 A1 | 3/2006 | Molisch et al. | |
| 2006/0126752 A1 | 6/2006 | Hansen et al. | |
| 2006/0165008 A1* | 7/2006 | Li et al. | 370/252 |
| 2007/0147536 A1* | 6/2007 | Melzer et al. | 375/267 |
| 2007/0217545 A1 | 9/2007 | Park et al. | |
| 2008/0232258 A1 | 9/2008 | Larsson et al. | |
| 2009/0129501 A1 | 5/2009 | Mehta et al. | |
| 2009/0175366 A1 | 7/2009 | Maltsev et al. | |
| 2009/0213955 A1* | 8/2009 | Higuchi et al. | 375/267 |

FOREIGN PATENT DOCUMENTS

| | | |
|---|---|---|
| CN | 1716838 | 1/2006 |
| CN | 1780173 | 5/2006 |
| CN | 1864346 | 11/2006 |
| JP | 2005341131 | 12/2005 |

(Continued)

OTHER PUBLICATIONS

International Search Report and Written Opinion issued for PCT/CN2007/070781; Dated Dec. 27, 2007; 5 Pages.

(Continued)

*Primary Examiner* — Shuwang Liu
*Assistant Examiner* — Sarah Hassan
(74) *Attorney, Agent, or Firm* — Fulbright & Jaworski L.L.P.

(57) ABSTRACT

A method for controlling a Multiple Input Multiple Output (MIMO) antenna system comprises at a first communication unit, receiving a table from a second communication unit, the table including a plurality of space time processing schemes based on predicted channel state information, selecting at least one of the schemes from the table, and transmitting data from the first communication unit to the second communication unit according to the at least one selected space time processing scheme.

24 Claims, 3 Drawing Sheets

FOREIGN PATENT DOCUMENTS

WO    WO-2006/052058 A2    5/2006

OTHER PUBLICATIONS

Author Unknown, AskOxford.com, Compact Oxford English Dictionary, AskOxford.com, downloaded from "http://www.askoxford.com/concise_oed/statistic?view=uk", downloaded on Dec. 24, 2009, 1 pg.

Office Action issued for U.S. Appl. No. 11/609,545 dated Jan. 13, 2010, 21 pgs.

D. Gore and A. Paulraj, "MIMO antenna subset selection with space-time coding," IEEE Transactions on Signal Processing, vol. 50, pp. 2580-2588, Oct. 2002, 9 pgs.

Office Action issued for U.S. Appl. No. 11/609,545 dated Sep. 2, 2009, 16 pgs.

* cited by examiner $\tau \in [0:0.2]$ $\tau \in [0.2:...]$

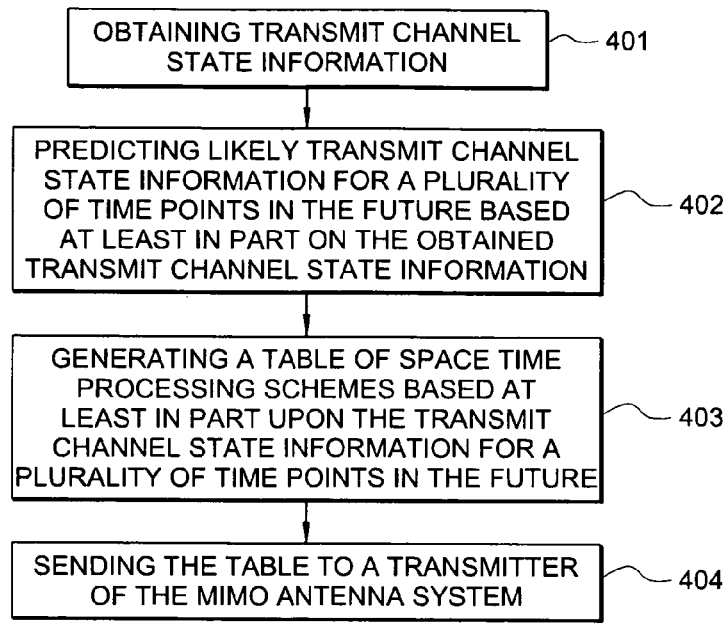
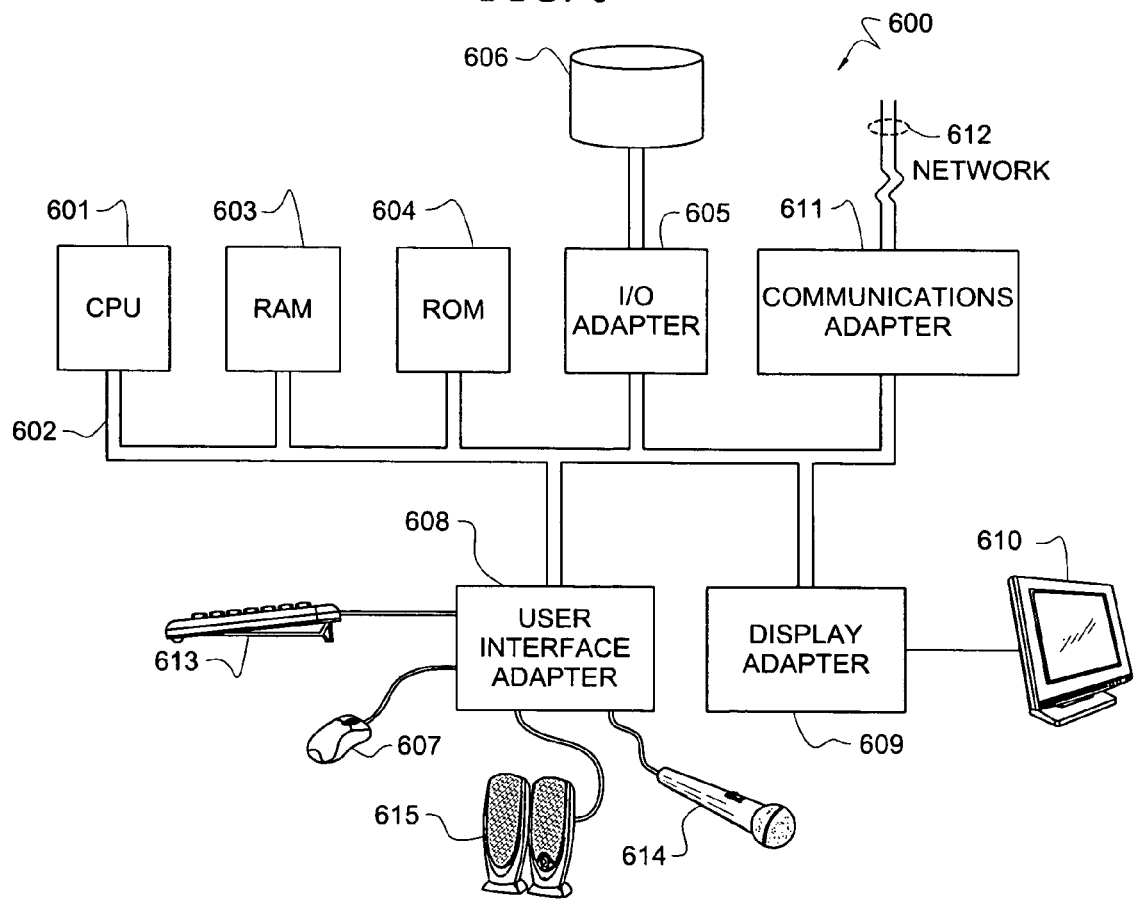

PRE-PROCESSING SYSTEMS AND METHODS FOR MIMO ANTENNA SYSTEMS

RELATED APPLICATIONS

This application is related to U.S. patent application Ser. No. 11/609,545, entitled, "ANTENNA CONFIGURATION SELECTION USING OUTDATED CHANNEL STATE INFORMATION," filed Dec. 12, 2006, the disclosure of which is hereby incorporated herein by reference.

TECHNICAL FIELD

The present description relates, in general, to Multiple-Input Multiple-Output (MIMO) antenna systems and, more specifically, to pre-processing in MIMO antenna systems.

BACKGROUND OF THE INVENTION

Multiple-Input Multiple-Output (MIMO) antenna systems use multiple antennas in a transmitter and multiple antennas in a receiver to increase communication throughput and/or range at the same bandwidth and power consumption when compared to a Single-Input Single-Output (SISO) antenna system. For instance, typically, multiple antennas increase range in a system. Also, for instance, when multiple sets of antennas are used, multiple simultaneous data streams can be sent and received in the system, thereby increasing data throughput. One use for MIMO systems is to send multiple streams of the same data to a receiver with multiple antennas. A processing unit in the receiver then uses the redundant data streams to construct a more reliable copy of the data. In this way, MIMO systems can also be used to increase reliability of the data transfer.

In send/receive systems, there are typically at least two ways to operate a communication system. One way is referred to as "Time Division Duplexing" (TDD), which uses a single channel for both forward link (from the transmitter) and reverse link (to the transmitter). Different time slots are used for forward and reverse link transmissions. Another way is Frequency Division Duplexing (FDD), which uses a channel for the forward link and a channel for the reverse link, each separated by a guard band.

Whether using TDD or FDD, MIMO systems can benefit from pre-processing, which may include determining antenna selection and power allocation over beam vectors prior to a forward or reverse link data burst. Pre-processing is often accomplished by measuring qualities of a given channel and adjusting the next transmission accordingly. In a TDD system, a transmitter can measure the qualities of its channel by examining the reverse-link bursts. This is because forward and reverse links use the same channel. However, in FDD systems, it is only the receiver that receives a burst over the forward link channel. Thus, measurements of the forward link channel qualities are best measured at the receiver rather than at the transmitter.

Further, due to the time offset between a first forward burst and a second forward burst (in a FDD system) and between a reverse burst and a forward burst (in a TDD system), channel qualities at the time of their measurement are outdated by the time of the next burst for which pre-processing is done. Basing pre-processing on outdated information can often cause degradation of communication. Accordingly, various systems use measured channel qualities and apply an algorithm thereto in order to predict channel qualities at the time of pre-processing. This helps to ensure more relevant channel information is used in pre-processing.

For example, it is possible for a TDD system to employ a technique whereby the transmitter measures channel qualities and applies pre-processing immediately before the next forward burst using channel qualities predicted specifically for the burst time. This is in contrast to FDD systems, wherein forward channel quality information is measured at a receiver, and wherein the receiver usually has no knowledge of the timing of future forward bursts. This introduces at least two problems: 1) how to do pre-processing for the forward burst when the channel information is not at the transmitter, and 2) how to predict channel information when the timing of the next burst is not known.

BRIEF SUMMARY OF THE INVENTION

Various embodiments of the present invention are directed to systems and methods for providing pre-processing in MIMO antenna systems. In one example embodiment, the MIMO system is a Frequency Division Duplexing (FDD) system that measures Channel State Information (CSI) for a forward link at a receiver. The receiver then generates predicted CSI for a number of time offset periods or points from the measurement reference time. The predicted CSI is used by the receiver to generate space time processing schemes. Generally, at least one scheme is generated for each time offset. The result is that the receiver has a plurality of schemes, each of the schemes corresponding to predicted CSI. The schemes may be, for example, control information specifying the use of one or more transmitter antennas.

Further in this example, the receiver constructs a table of the schemes. The schemes can be indexed by time offset from the reference time. The receiver transmits the table of schemes to the transmitter. Before the next forward burst, the transmitter selects from the table a scheme that corresponds to the burst time and performs the forward link burst according thereto.

In another example, the table of schemes is indexed by reliability value—that is, a value indicating the reliability of the predicted CSI. Reliability is directly related to time offset, so that each of the schemes has a corresponding reliability value. The transmitter can the select a scheme based on reliability value.

An advantage of some embodiments is that they provide a way to perform at least some pre-processing at a receiver on behalf of the transmitter for the forward link. Thus, the fact that the CSI is at the receiver, rather than at the transmitter, is no obstacle to the pre-processing technique. Further, since schemes are generated for a plurality of time offsets, the receiver can provide a scheme for the next forward burst without knowing the exact time for the forward burst. While the example above refers to specific functions of a transmitter and a receiver, such configuration of functions is not the only configuration possible. In fact, some embodiments include a role reversal wherein a transmitter measures reverse link CSI, generates control information based thereon, and sends the control information back to the receiver. In fact, various embodiments of the invention can be adapted for any MIMO system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 4 is an illustration of an exemplary method for providing pre-processing to a MIMO system according to one embodiment of the invention;

FIG. 6 illustrates an example computer system adapted according to one embodiment of the present invention.

DETAILED DESCRIPTION OF THE INVENTION

Figure 1:
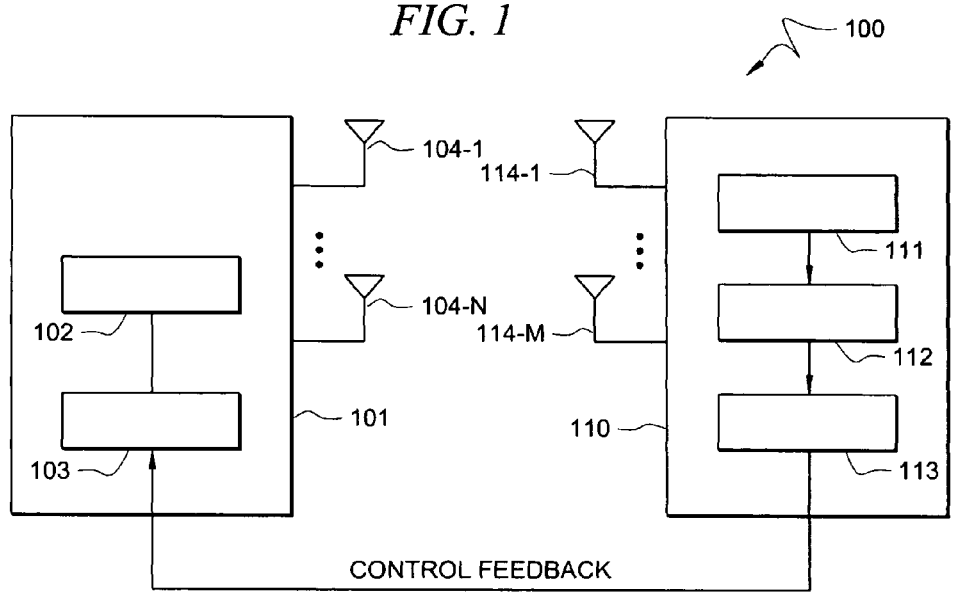
FIG. 1 is an illustration of an exemplary Multiple Input Multiple Output (MIMO) antenna system, which includes an exemplary transmitter and an exemplary receiver adapted according to one embodiment of the invention.

FIG. 1 is an illustration of exemplary Multiple Input Multiple Output (MIMO) antenna system 100, which includes exemplary transmitter 101 and exemplary receiver 110 adapted according to one embodiment of the invention. Receiver 110 includes multiple antennas 114, as does transmitter 101. Receiver 110 and transmitter 101 may have the same number of antennas in some embodiments and different numbers of antennas in other embodiments; however, the invention is not limited by number of antennas as long as each transmitter and receiver each include a plurality of antennas.

In operation, receiver 110 receives a burst of data from transmitter 101 through one or more antennas 114. In addition to any information processing, which is not discussed herein, receiver 110 also examines the signals and channels to create Channel State Information (CSI). CSI, in general, describes various properties of one or more transmission radio frequency channels at the time of transmission. CSI can include, e.g, amplitude attenuation and phase rotation, and may describe any other property of a transmission channel.

Before going further, it may be helpful to explain some basic principles regarding CSI and its calculation. For a traditional single-antenna wireless communication system, $h(t)$ is usually used to indicate the channel coefficient between the transmit antenna and the receive antenna. Here, equation (1) gives a complex value that describes both the amplitude attenuation and the phase rotation between the received signal and the transmitted signal.

$$h(t) = a(t) e^{j\Theta(t)} \quad (1)$$

Furthermore, the time index of $h(t)$ indicates that it is a time-varying value. In practice, $h(t)$ is treated/modeled as a random process with certain correlation properties defined in equation (2) where $E(\bullet)$ represents the expectation operation over the random value, $(\ )^*$ represents the conjugate transpose operation, and $\rho(\tau)$ is a value between 0 and 1.

$$\rho(\tau) = E\left(\frac{h(t)h^*(t+\tau)}{|h(t)||h(t+\tau)|}\right) \quad (2)$$

Based on this property, it is usually possible to predict the channel coefficient $h(t+\tau)$ based on $h(t)$. Any methodology for channel prediction can be used in various embodiments. One method is given by equation (3), where $h_w$ is a randomly generated value.

$$h(t+\tau) = \rho(\tau)h(t) + \sqrt{1-\rho^2(\tau)}h_w \quad (3)$$

In this sense, $\rho(\tau)$ can also be explained as a reliability value of $h(t)$ to $h(t+\tau)$ as the larger $\rho(\tau)$ is, the more likely that $h(t)$ is same as $h(t+\tau)$.

The above examples only consider a single path channel for purposes of simplicity. In multiple path channel systems, the multiple paths may be observed at the receiver with channel coefficients $h_1(t), \ldots, h_L(t)$.

When multiple antennas are deployed at both transmit and receive sides (as in a MIMO system), the channels between the transmitters and the receivers will be in a matrix form $H(t)$ rather than one single element, as in equation (4) where $h_{m,n}(t)$ denotes the channel coefficient between transmit antenna "n" and receive antenna "m":

$$H(t) = \begin{bmatrix} h_{1,1}(t) & h_{1,2}(t) & \cdots & h_{1,N}(t) \\ h_{2,1}(t) & \ddots & & \\ \vdots & & & \vdots \\ h_{M,1}(t) & & \cdots & h_{M,N}(t) \end{bmatrix} \quad (4)$$

The matrix $H(t)$ is one way to represent CSI, and it is the instant channel state matrix for a given moment. Additionally, some compact CSIs can be calculated from the instant channel matrix, such as F-norm of the matrix $\|H(t_1)\|_F$, the largest Eigen value of $H(t_1)$ or the corresponding Eigen vector, the resultant equivalent channel gain after, e.g., Vertical Bell Lab Layered Space Time Processing (V-BLAST) operation or other such derived information. Other kinds of CSI may include second order statistic parameters of $H(t)$, such as the transmit spatial correlation matrix, receive spatial correlation matrix, time correlation function $\rho(\tau)$, and the like. Any kind of CSI now known or later developed may be used in some embodiments of the invention.

Returning to FIG. 1, estimation unit 111 is operable to create predicted transmission CSI for a number of time points in the future based on the current CSI. Then, table unit 112 uses the predicted CSI to create a table of control information entries. In one embodiment, each of the entries in the table represents control information corresponding to one future time point, and the table is indexed by time point. In another embodiment, each of the entries corresponds to a reliability value, and the table is indexed according to reliability value.

Transmission unit 113 sends the table to transmitter 101 by, e.g., utilizing a separate control channel. Receiving unit 103 receives the table, and control unit 102 uses the control information in the table to determine how it uses antennas 104 to transmit the next burst of data. While the various functional units are depicted as located in transmitter 101 and receiver 110, it should be noted that such hardware configurations are merely illustrative, as the functional units may also be hardware and/or software-based components located in or executed by processing/control units associated with transmitter 101 and/or receiver 110.

Figure 2:
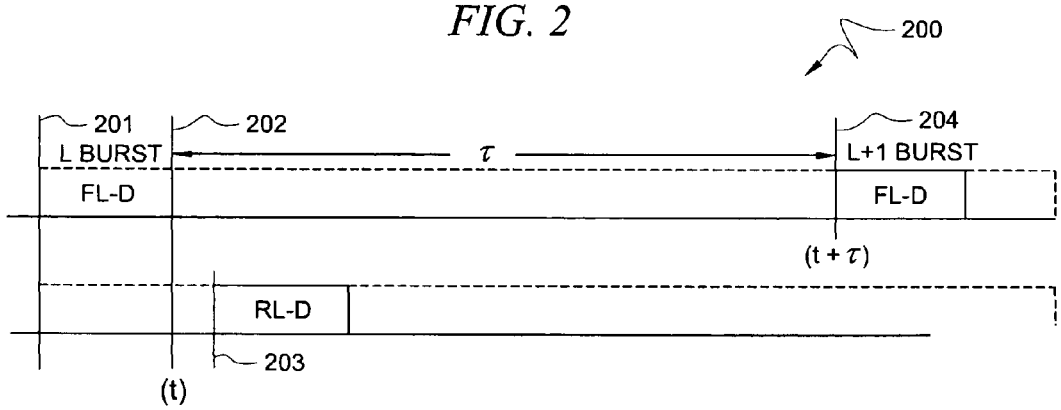
FIG. 2 is an illustration of an exemplary data burst timeline according to one embodiment of the invention.

FIG. 2 is an illustration of exemplary data burst timeline 200 according to one embodiment of the invention. Timeline 200 shows data bursts in a Frequency Division Duplexing (FDD) transmission arrangement. At point 201, the transmitter begins a forward link burst. The forward link burst ends at point 202 (time "t"). Since the present example is a send/receive system, the receiver begins a reverse-link data burst at point 203; however, this is not a focus of the present discussion and will not be described further.

At time point 202 or shortly thereafter, the receiver has received the forward data burst and begins to generate transmission CSI for time t. Using CSI for time t, the receiver then predicts values for CSI at time t+τ (the time to begin the next transmission data burst). One formula that can be used to predict values for CSI at a time t+τ is shown as equation (5).

$$H(t+\tau) = \rho(\tau)H(t) + \sqrt{1-\rho^2(\tau)} H_w \quad (5)$$

Equation (5) is simply another way to express equation (1) in light of equation (4). The H matrix, for any given time, represents a measurement of transmission CSI for that time. An example function describing ρ is shown as equation (2), where $J_0( )$ is the $0^{th}$ order Bessel function of the first kind, and $f_d$ is the maximum Doppler shift.

$$\rho(t) = J_0^2(2\pi f_d \tau) \quad (6)$$

It should be noted that correlation function ρ(τ) may differ based upon the particular wireless propagation scenario, and equation (2) is merely exemplary for a Raleigh fading channel.

In typical FDD systems, the receiver does not know actual values for τ and, therefore, does not know a value for time point 204. Thus, in various embodiments of the invention, the receiver calculates H(t+τ) values for a variety of possible ranges of τ. For example, the receiver may generate H(t+τ) values for τ=0 to 0.02 sec., τ=0.02 sec. to 0.04 sec., τ=0.04 sec. to 0.06 sec., and so on. Then, the receiver uses each of the H(t+τ) values to calculate which antennas to use in the next forward data burst. In this example, a "scheme" is a space time coding scheme to identify antennas for use in an operation. For example, a scheme can represent instructions for using one or more antennas in the transmitter for the next transmission. Example schemes can specify space time coding and layered space time signal processing over all antennas, over partial antennas together with an antenna selection, and/or over all antennas together with precoding/weighting. Any kind of coding scheme can be used in various embodiments, including hybrid schemes that include elements of both space time coding and layered space time signal processing. Example schemes can also specify arrangements that are hybrids of space time and layered techniques. Any scheme now known or later developed can be used in various embodiments, including, but not limited to, Space Time Block Coding (STBC), Space Time Trellis Coding (STTC), and the like. A technique for choosing among schemes for optimal performance is shown in equation (7).

$$\Phi_{opt}(t+\tau) = \arg\max_{\Phi}\{[perf(\Phi(H(t+\tau)))]\} \quad (7)$$

Equation (7) indicates optimal space time schemes for the predicted channel matrix H(t+τ) based on certain performance criteria, such as Bit Error Rate (BER), Packet Error Probability (PER), Pair-wise Error Probability (PEP), data throughput, and the like.

Equation (7) is exemplary, and various embodiments of the invention may use any of a variety of techniques for CSI prediction. Generally CSI prediction techniques calculate H(t+τ) as a function of current channel matrix H(t) and often as a function of past channel matrix $H(t-t_i)$. Additionally or alternatively, it is possible to use CSI prediction techniques that only predict some characters of the channel matrix, such as amplitude or phase. Different methods may have different accuracy and robustness properties.

For the CSI prediction technique as stated above as Equation (7), the optimal space time scheme is be determined by ρ(τ). Where ρ which ranges from 0 to 1, the receiver calculates the performance (e.g., BER, PER, PEP) of all space time schemes within a predetermined set, and selects the ones that achieve best performance for a given ρ range or value. Different values for ρ will generally correspond to different optimal schemes. Thus, it is possible for the receiver to generate a table of space time schemes indexed by ρ.

In addition, because ρ is a function of τ, it is also possible to generate a table of space time schemes which is indexed by τ. For example, assume that two transmit antennas are deployed and that the system can choose between two space time schemes (antenna index selection scheme and STBC scheme). Also, assume that CSI prediction has calculated that when ρ is large, for example ρ∈[1,0.6], it is better to transmit the signal from one antenna selected based on H(t) and that when ρ is small, for example ρ∈[0.6,0], it is better to use STBC over two antennas. The receiver then creates a table, such as example Table 1:

TABLE 1

| Selected antenna index | STBC |
|---|---|
| [1, 0.6] | [0.6, 0] |

Also assume that ρ, as a function of τ, is high at some ranges of τ and low at others. Thus, it is also possible to have another table indexed by τ, as shown in example Table 2:

TABLE 2

| Selected antenna | STBC | Selected antenna | STBC |
|---|---|---|---|
| [0, τ$_1$] | [τ$_1$, τ$_2$] | [τ$_2$, τ$_3$] | [τ$_3$, +∞] |

The receiver sends one or both of the tables to the transmitter, which selects at least one of the schemes from the tables by, e.g., selecting the scheme from Table 2 that corresponds to the actual value of τ at the next forward burst beginning at time point 204. Various embodiments of the invention may select schemes based upon τ, ρ, a combination thereof, or any other suitable criteria.

Once the transmitter selects a scheme, the scheme can be applied to the next forward link data burst. In fact, other schemes in the table can be applied to subsequent data bursts when, e.g., subsequent values of τ match τ ranges of schemes in the table or when subsequent desired ρ values match ρ ranges of schemes in the table.

Figure 3A:
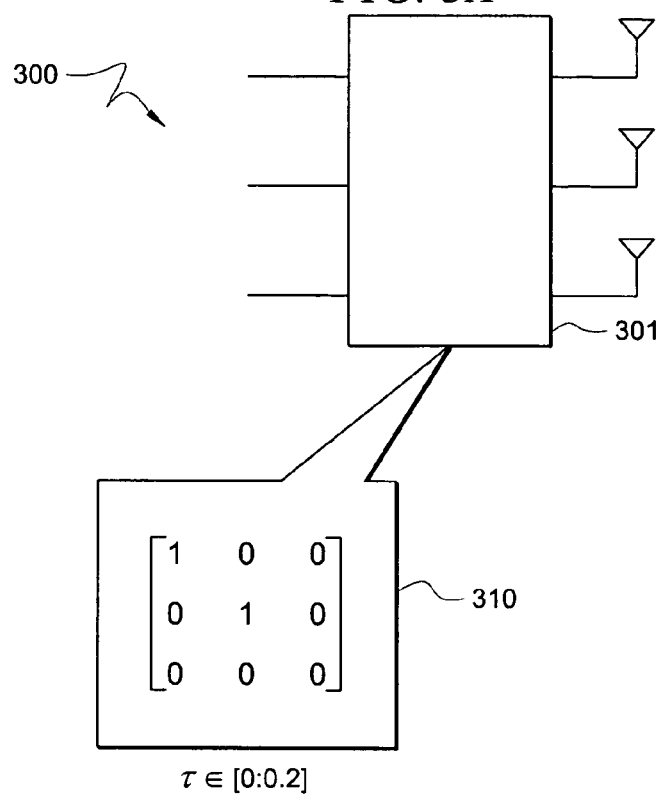
FIGS. 3A and 3B illustrate applying a scheme to a data burst according to one embodiment of the invention.
Figure 3B:
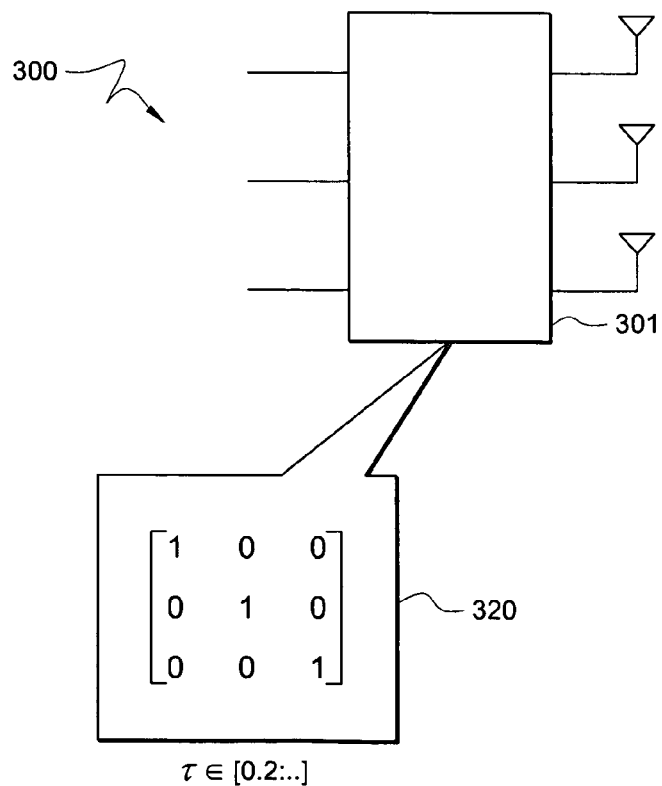

FIGS. 3A and 3B illustrate applying a scheme to a data burst according to one embodiment of the invention. In FIGS. 3A and 3B, transmitter control system 300 includes space time coding and spatial mapping portion 301. The actual antenna selection operation can be represented as a multiplication of a matrix or a scalar by either of matrices 310 and 320. Thus, at a first τ range, the system can apply a scheme according to matrix 310, and at another τ range, the system can apply a scheme according to matrix 320, wherein matrix 310 generally corresponds to an antenna selection scheme (as may other matrices that select fewer than all antennas), and matrix 320 generally corresponds to an SBTC or STTC scheme. As shown, matrix 310 results in an arrangement where only two of three available antennas in the transmitter are used, whereas matrix 320 results in an arrangement where all three antennas are used.

In some embodiments, the transmitter can continue to select schemes from the table for subsequent forward bursts as long as τ values and/or desired ρ values match, receiving a new table every few data burst periods. An advantage of providing fewer table updates is that it uses less of the receiver's processing power; however, CSI may become stale if predicted for longer time periods. On the other hand, frequent updates may ensure more accurate predicted CSI but may also push the limits of receiver processing power and/or control channel bandwidth.

When space time coding and spatial mapping portion 301 receives a scheme, it applies the scheme by switching one or more antennas on or off. In other examples it is also possible to adjust the power allocation over beam vectors from the antennas that are switched on. In an STBC example (as in FIG. 3B), the space time coding and spatial mapping portion 301 uses the STBC technique to encode the data stream into three mutual protected symbol streams and map them onto three transmit antennas. In some example embodiments, tables sent to the transmitter may include matrices, such as matrices 310 and 320, rather than an indication of the optimal schemes, themselves.

FIG. 4 is an illustration of exemplary method 400 for providing pre-processing to a MIMO system according to one embodiment of the invention. Method 400 may be performed, e.g., by a receiver in a MIMO system. Various kinds of receivers exist and can be used in embodiments of the invention. Examples of types of receivers include cell phones and other handheld devices, desktop computers, laptop computers, rack-type computers, remote devices, and the like. In fact, various Wireless Local Area Networks (WLANs) include MIMO technology, such as systems that employ the IEEE 802.11n wireless standard and can be adapted according to one or more embodiments of the invention.

In step 401, the receiver obtains transmit CSI. In one example, the receiver examines a data burst from the transmitter to discern physical details of the transmit channel. Such physical details may include amplitude, phase, directivity, gain, and the like. The CSI may be obtained in any of a variety of ways. For example, the receiver may derive transmit CSI by measuring signal strength, polarity, attenuation, or any other signal parameters using any method now known or later developed. In another embodiment, transmit CSI is sent to the receiver from another component in the system.

In step 402, the receiver predicts likely transmit CSI for a plurality of time points in the future based at least in part on the obtained transmit CSI. Thus, using transmit CSI at time t, the receiver predicts transmit CSI for time t plus τ at a plurality of possible τ ranges and/or values. The number of τ values can be tailored for a specific application, taking into account, e.g., desired accuracy, processing power limits, burst duration, and the like. However, any number of τ values as τ approaches infinity is possible.

In step 403, a table of space time processing schemes is generated based at least in part upon the transmit CSI for a plurality of time points in the future. In one example, each of the schemes identifies one or more transmit antennas for use in a data burst. The generating may include using the predicted CSI to determine which schemes produce optimal performance at a given τ or ρ. In other words, in one example, the receiver compares probable antenna performance values (e.g., gain, directivity, bit error rate, and the like) for each scheme for each value or range of τ. The most optimal schemes are then indicated in the table.

In some examples the table is indexed by time offset (τ). In other examples, the table is indexed by reliability value (ρ), where a "1" is totally reliable, and a "0" is totally unreliable. Where the table is indexed by time offset, generating control information by use of the table typically includes calculating the schemes time offset-by-time offset, then arranging the table so that one axis thereof is a time offset axis.

Where the table is indexed by reliability value, the process typically includes calculating optimal schemes for each reliability value. In other words, in one example, the receiver compares antenna performance values for each value or range of ρ. The most optimal schemes are then indicated in the table. The table is arranged such that it includes a reliability axis. Further, since there is a relationship between reliability and time offset, each reliability value corresponds to at least one time offset, although it may not be immediately apparent from the arrangement of the table. When table indexed by ρ is fed back to the transmitter, the transmitter typically calculates the ρ corresponding to the burst transmission moment, then uses that ρ value to select the corresponding s scheme in the table.

In step 404, the table is sent to a transmitter of the MIMO antenna system. The table can be sent in any of a variety of ways, including via a dedicated control channel, a reverse-link data channel, by wire, fiber optic cable, and the like. In order minimize bandwidth from such transmissions, many embodiments represent schemes by antenna selection matrices (as in FIGS. 3A and 3B). However, various embodiments can represent schemes with more complexity, depending on parameters such as control bandwidth and the like.

Figure 5:
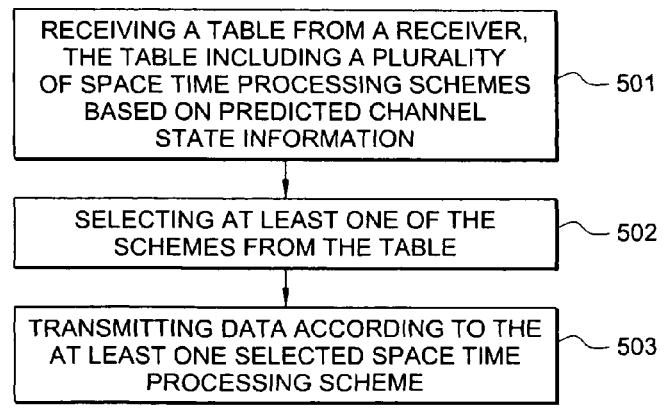
FIG. 5 is an illustration of an exemplary method adapted according to one embodiment of the invention.

FIG. 5 is an illustration of exemplary method 500 adapted according to one embodiment of the invention. Method 500 may be performed, e.g., by a transmitter in a MIMO antenna system. Examples of possible MIMO transmitters include, e.g., cellular base stations, wireless routers employing the IEEE 802.11n standard, personal or other computers in peer-to-peer networks, and the like.

In step 501, the transmitter receives a table from a receiver, the table including a plurality of space time processing schemes based on predicted channel state information. In one example, the receiving can be via a dedicated control channel, a reverse-link data channel, by wire, fiber optic cable, and the like. In one example, the table contains indications of various schemes determined to be optimal for given values of τ and/or ρ for use in a transmit data burst. As described above with regard to method 400 (FIG. 4), the table may be indexed such that the schemes therein are arranged by time offset or reliability.

In step 502, the transmitter selects at least one of the schemes from the table. In one example, the transmitter includes a counter or clock that can be used to determine the actual time offset from the reference time, t. The transmitter can then select a scheme by matching the determined time offset to the index of the table, assuming that the table is indexed by time offset. In another example, the transmitter selects the scheme based upon reliability when the table is indexed by reliability.

In step 503, the transmitter transmits data according to the at least one selected space time processing scheme. In an embodiment where the schemes identify antennas to switch on during a data burst, step 503 includes employing the identified antennas in the burst while not using non-identified antennas.

While methods 400 (FIG. 4) and 500 are shown as a series of steps, various embodiments of the invention may differ somewhat by adding steps, deleting steps, combining steps, or rearranging steps. For instance, in one example, the steps of method 500 are performed immediately after the steps of method 400, where the table from step 404 is the same as the table in step 501. Further, steps 502 and 503 may be repeated a plurality of times for a single table, such that multiple schemes from the same table are used before a new table is generated and received. Also, methods 400 and 500 may be repeated to provide MIMO pre-processing throughout a series of data communications.

An advantage of various embodiments of the invention is that such systems can be adapted to provide MIMO pre-processing in an efficient way, especially in FDD systems. In fact, some systems can benefit from up to a one order of magnitude drop in Pair-Wise Error Probability (PEP) compared to FDD systems that perform no pre-processing. Further, some systems can be economically adapted to conform to one or more embodiments, since many systems can be adapted through adding software functionality with few or no hardware modifications.

While the embodiments above have been described in the context of a receiver performing some pre-processing and sending some control-type information to a transmitter, various embodiments of the invention may include other configurations. For example, some embodiments include a transmitter that measures and predicts CSI for a reverse link channel and sends tables of control-type information to the receiver. Accordingly, any system wherein one communication unit measures a channel, performs some pre-processing, and sends control-type information to another communication unit can be adapted according to one or more embodiments of the invention. Further, while FDD MIMO systems typically benefit more from implementations of the invention than do TDD MIMO systems, it should be noted that embodiments of the invention are not limited to FDD systems only. In fact, systems that include any duplexing technique may be adapted according to one or more embodiments.

Some embodiments of the invention include methods for controlling MIMO antenna systems, wherein the various steps may be performed by hardware- and/or software-based components associated with antenna control systems or processing systems associated with the transmitters and receivers of those systems. When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

FIG. 6 illustrates an example computer system 600 adapted according to embodiments of the present invention. That is, computer system 600 comprises an example system on which embodiments of the present invention may be implemented, such as systems that control or perform the processing for a transmitter or receiver according to one or more embodiments. Central processing unit (CPU) 601 is coupled to system bus 602. CPU 601 may be any general purpose CPU. However, the present invention is not restricted by the architecture of CPU 601 as long as CPU 601 supports the inventive operations as described herein. CPU 601 may execute the various logical instructions according to embodiments of the present invention. For example, CPU 601 may execute machine-level instructions according to the exemplary operational flows described above in conjunction with FIGS. 4 and 5.

Computer system 600 also preferably includes random access memory (RAM) 603, which may be SRAM, DRAM, SDRAM, or the like. Computer system 600 preferably includes read-only memory (ROM) 604 which may be PROM, EPROM, EEPROM, or the like. RAM 603 and ROM 604 hold user and system data and programs, as is well known in the art.

Computer system 600 also preferably includes input/output (I/O) adapter 605, communications adapter 611, user interface adapter 608, and display adapter 609. I/O adapter 605, user interface adapter 608, and/or communications adapter 611 may, in certain embodiments, enable a user to interact with computer system 600 in order to input information, such as desired data for transmissions, desired data channels for use, and the like.

I/O adapter 605 preferably connects to storage device(s) 606, such as one or more of hard drive, compact disc (CD) drive, floppy disk drive, tape drive, etc. to computer system 600. Communications adapter 611 is preferably adapted to couple computer system 600 to network 612 (e.g., communication network 108, 804, 903 described in FIGS. 1, 2, 8, and 9 above). User interface adapter 608 couples user input devices, such as keyboard 613, pointing device 607, and microphone 614 and/or output devices, such as speaker(s) 615 to computer system 600. Display adapter 609 is driven by CPU 601 to control the display on display device 610 to, for example, display a user interface.

It shall be appreciated that the present invention is not limited to the architecture of system 600. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controlling a Multiple Input Multiple Output (MIMO) antenna system, the method comprising:
    at a first communication unit, receiving a table from a second communication unit, said table including a plurality of space time processing schemes based on predicted channel state information, wherein said schemes in said table are organized by respective time period to which each corresponds;
    selecting at least one of said schemes from said table, wherein said selecting comprises:
        selecting said at least one scheme based on its respective time period; and
    transmitting data from said first communication unit to said second communication unit according to said at least one selected space time processing scheme.

2. The method of claim 1 wherein said transmitting comprises:
    applying a Space Time Block Coding (STBC) technique to said transmission.

3. The method of claim 1 wherein said transmitting data comprises:
    selecting one or more of a plurality of antennas in said first communication unit based upon control information in said at least one scheme; and
    transmitting said data using said selected one or more antennas.

4. The method of claim 1 wherein said channel state information includes information selected from the list consisting of:
    amplitude; and
    phase rotation.

5. The method of claim 1 wherein said transmitting is performed in accordance with a Frequency Division Duplexing (FDD) method.

6. The method of claim 1 wherein said first communication unit is a transmitter communicating on a forward link channel, and said second communication unit is a receiver communicating on a reverse link channel.

7. A method for controlling a Multiple Input Multiple Output (MIMO) antenna system, the method comprising:
    at a first communication unit of said MIMO antenna system, obtaining transmit channel state information from a burst from a second communication unit;
    predicting likely transmit channel state information for a plurality of time points in the future based at least in part on said obtained transmit channel state information;
    generating a table of space time processing schemes based at least in part upon said transmit channel state information for a plurality of time points in the future, wherein said table is arranged by said plurality of time points; and
    sending said table to said second communication unit of said MIMO antenna system.

8. The method of claim 7 wherein said obtaining comprises:
    estimating said transmit channel state information.

9. The method of claim 7 wherein said obtained channel state information corresponds to a time, t, and wherein said each of said plurality of time points corresponds to a time offset from time t.

10. The method of claim 7 wherein each of said schemes corresponds to a respective time point and a respective reliability value.

11. A method for controlling a Multiple Input Multiple Output (MIMO) antenna system, the method comprising:
    at a first communication unit of said MIMO antenna system, obtaining transmit channel state information from a burst from a second communication unit;
    predicting likely transmit channel state information for a plurality of time points in the future based at least in part on said obtained transmit channel state information;
    generating a table of space time processing schemes based at least in part upon said transmit channel state information for a plurality of time points in the future, wherein each of said space time processing schemes is represented in the table by a matrix identifying one or more transmit antennas in said second communication unit for use in a subsequent transmission; and
    sending said table to said second communication unit of said MIMO antenna system.

12. The method of claim 7 further comprising the following actions performed at said second communication unit of said MIMO antenna system:
    selecting at least one of said space time processing schemes from said table; and
    transmitting data based at least in part on control information in said selected space time processing scheme.

13. The method of claim 7 wherein said first communication unit is a receiver communicating on a reverse link channel, and said second communication unit is a transmitter communicating on a forward link channel.

14. A Multiple Input Multiple Output (MIMO) antenna system, said MIMO antenna system comprising:
    a communication unit including:
        a plurality of antennas:
        a receive unit operable to receive a table of space time processing schemes and further operable to select one of said schemes from said table, wherein each of said schemes identifies one or more of said plurality of antennas for use in transmitting said data; and
        a control unit operable to transmit data using said plurality of antennas according to said selected space time processing scheme.

15. The MIMO antenna system of claim 14 wherein each of said schemes is based upon predicted channel state information for said communication unit.

16. The MIMO antenna system of claim 14 wherein said communication unit is a MIMO transmitter operable to transmit said data on a forward link.

17. The MIMO antenna system of claim 14 wherein said receive unit is operable to select one of said schemes based upon a desired reliability value associated with said one of said schemes.

18. The MIMO antenna system of claim 14 wherein said receive unit is operable to select one of said schemes based upon a time offset from a reference time, said time offset associated with said one of said schemes.

19. A Multiple Input Multiple Output (MIMO) antenna system, said MIMO antenna system comprising:
    a first communication unit including:
        a plurality of antennas operable to receive transmissions from a corresponding MIMO second communication unit;
        an estimation unit operable to estimate future channel state information from said transmissions, wherein said estimation unit is further operable to estimate future channel state information for a plurality of time points in the future;
        a table unit operable to construct tables of control information entries, wherein each of said entries is based at least in part on said estimated future channel state information, and wherein said table unit is further operable to construct tables of control information entries arranged by said plurality of time points; and
a transmission unit operable to send said tables to said corresponding MIMO second communication unit.

20. The MIMO antenna system of claim 19 wherein said first communication unit is a MIMO receiver operable to send data bursts on a reverse link, and said second communication unit is a transmitter operable to communicate on a forward link.

21. The MIMO antenna system of claim 19 wherein said estimation unit is operable to generate a plurality of future channel state information entries, each of said future channel state information entries corresponding to a respective time offset from a reference time point and corresponding to a respective reliability value.

22. The MIMO antenna system of claim 21 wherein said table unit is operable to construct said tables indexed by respective reliability values.

23. The MIMO antenna system of claim 21 wherein said table unit is operable to construct said tables indexed by respective time offset.

24. The MIMO antenna system of claim 14 wherein said schemes each correspond to a respective time period;
wherein said table is organized by said respective time periods; and
wherein said receive unit is further operable to select said one of said schemes from said table based, at least in part, on its respective time period.

* * * * *